(12) United States Patent
Frederiksen et al.

(10) Patent No.: US 8,274,960 B2
(45) Date of Patent: Sep. 25, 2012

(54) APPARATUS, METHODS, AND COMPUTER PROGRAM PRODUCTS PROVIDING A DYNAMIC HEADER STRUCTURE FOR SIGNALING RESOURCE ALLOCATIONS

(75) Inventors: Frank Frederiksen, Klarup (DK); Lars E. Lindh, Helsingfors (FI); Jussi K. Ojala, Helsinki (FI); Samuli Visuri, Helsinki (FI)

(73) Assignee: Nokia Corporation, Espoo (FI)

( * ) Notice: Subject to any disclaimer, the term of this patent is extended or adjusted under 35 U.S.C. 154(b) by 638 days.

(21) Appl. No.: 12/284,958

(22) Filed: Sep. 25, 2008

(65) Prior Publication Data

US 2009/0083424 A1    Mar. 26, 2009

Related U.S. Application Data

(60) Provisional application No. 60/995,544, filed on Sep. 26, 2007.

(51) Int. Cl.
*H04B 7/216*    (2006.01)
(52) U.S. Cl. ........................ 370/342; 370/312
(58) Field of Classification Search ........................ None
See application file for complete search history.

(56) References Cited

U.S. PATENT DOCUMENTS

2007/0104136 A1* 5/2007 Pecen et al. .................. 370/329
2008/0037496 A1* 2/2008 Smith et al. ................... 370/340
2008/0049690 A1* 2/2008 Kuchibhotla et al. ......... 370/338

OTHER PUBLICATIONS

"Outcome from offline discussion on downlink control signaling", Ericsson et al., R1-073835, 3GPP TSG RAN WG1 #50, Athens, Greece, Aug. 20-24, 2007, 10 pgs.
"3$^{rd}$ Generation Partnership Project; Technical Specification Group Radio Access Network; Evolved Universal Terrestrial Radio Access (E-UTRA); Physical layer procedures (Release 8)", 3GPP TS 36.213, V2.1.0 (Sep. 2007), 14 pgs.
Motorola: "E-UTRA DL L1/L2 Control Channel Information & RA map reduction," 3GPP Draft; R1-070036 DL_L1L2CCH_FIELDS, RAMP, 3$^{rd}$ Generation Partnership Project (3GPP), Mobile Competence Centre; vol. RAN WG1, Jan. 10, 2007, XP050104098.
Philips et al: "Downlink Resource Allocation Signaling on PDCCH," 3GPP Draft; R1-080821, 3$^{rd}$ Generation Partnership Project (3GPP), Mobile Competence Centre, vol. RAN WG1, Feb. 6, 2008, XP050109301.
Etri: "Downlink L1/L2 Control Signaling," 3GPP Draft; R1-070079 DL Control Signaling, 3$^{rd}$ Generation Partnership Project (3GPP), Mobile Competence Centre; vol. RAN WG1, Jan. 10, 2007, XP050104134.

(Continued)

*Primary Examiner* — David Oveissi
(74) *Attorney, Agent, or Firm* — Harrington & Smith

(57) ABSTRACT

In one non-limiting, exemplary embodiment, a method includes: receiving a message including a resource allocation map having a first portion and a second portion; utilizing the first portion to determine a specific mapping scheme of a plurality of mapping schemes, wherein the determined specific mapping scheme is used for the second portion; and obtaining, based on the determined specific mapping scheme, resource allocation information based on the second portion. In another non-limiting, exemplary embodiment, a method includes: generating a message including a resource allocation map having a first portion and a second portion, wherein the first portion is indicative of a specific mapping scheme of a plurality of mapping schemes that are applicable to the second portion; and transmitting the generated message.

54 Claims, 6 Drawing Sheets

OTHER PUBLICATIONS

IEEE, S. Low et al., "A Simple Theory of Traffic and Resource Allocation in ATM", (Aug. 19, 1991), (pp. 1633-1637).

IEEE, Sik Choi et al., "Fast Handover Scheme for Real time Downlink Services in IEEE 802.16e BWA System", (2005), (5 pages).

* cited by examiner

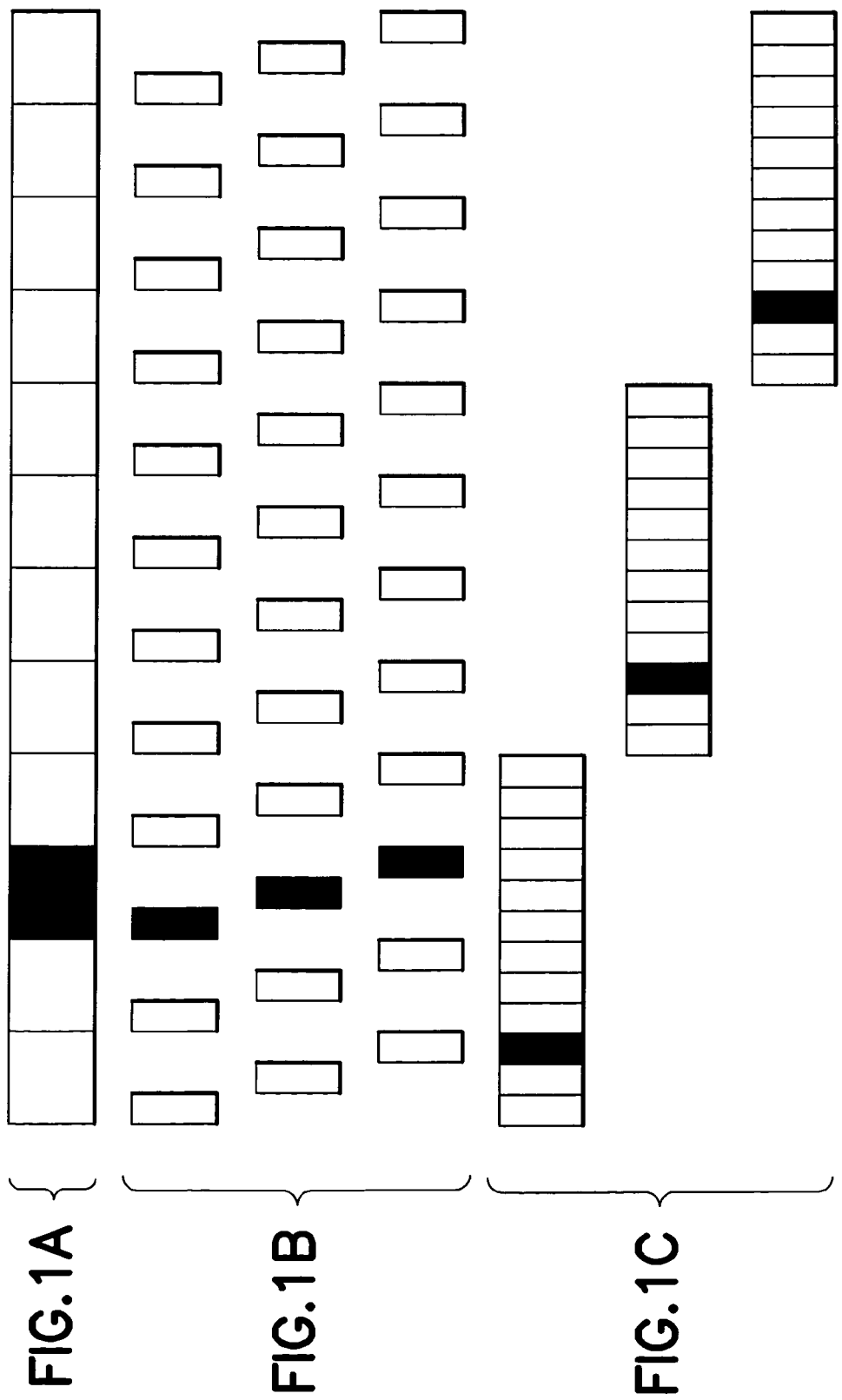

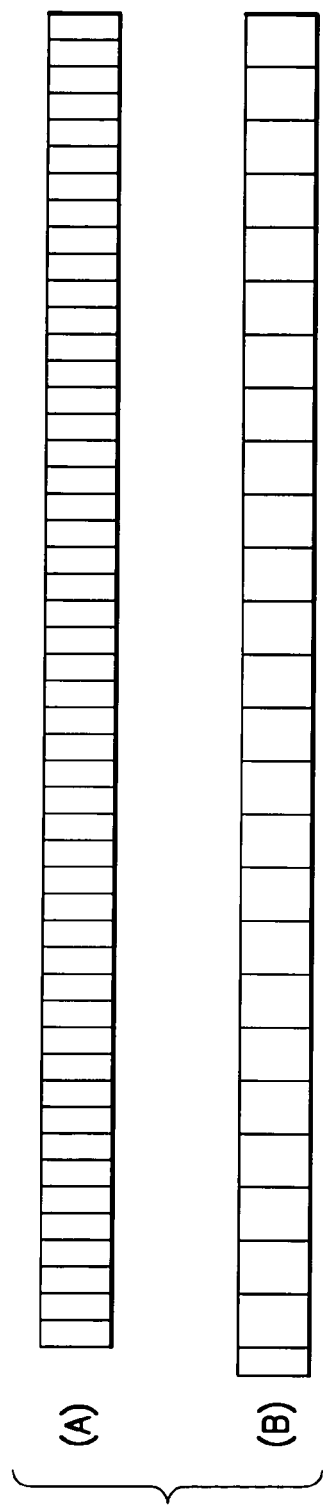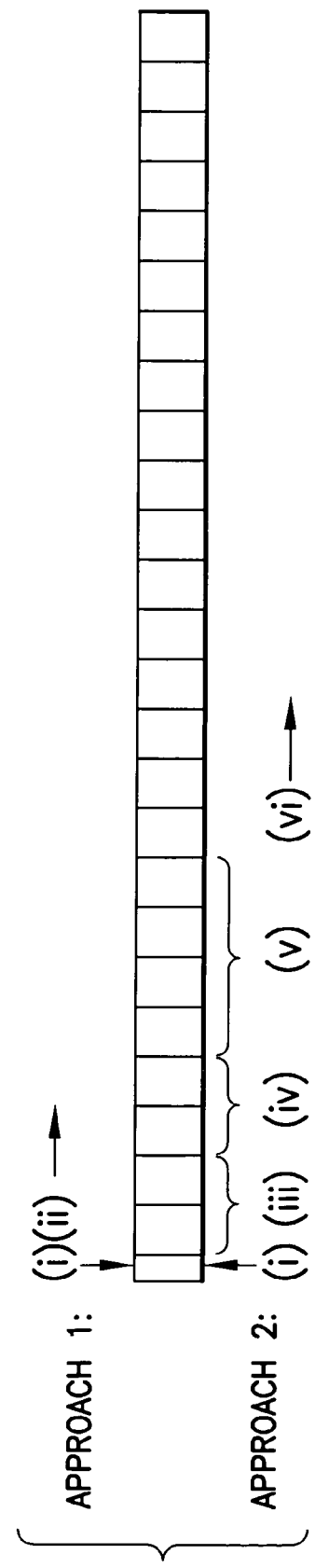

APPARATUS, METHODS, AND COMPUTER PROGRAM PRODUCTS PROVIDING A DYNAMIC HEADER STRUCTURE FOR SIGNALING RESOURCE ALLOCATIONS

CROSS-REFERENCE TO RELATED APPLICATIONS

This patent application claims priority under 35 U.S.C. §119(e) from U.S. Provisional Patent Application No. 60/995,544, filed Sep. 26, 2007, the disclosure of which is incorporated by reference herein in its entirety.

TECHNICAL FIELD

The exemplary embodiments of this invention relate generally to wireless communication systems and, more specifically, relate to signaling allocations, such as allocations of resource blocks, for example.

BACKGROUND

The following abbreviations are utilized herein:

| | |
|---|---|
| 3GPP | third generation partnership project |
| BW | bandwidth |
| DCI | downlink control information |
| DL | downlink (Node B to UE) |
| E-UTRAN | evolved universal terrestrial radio access network (LTE) |
| LTE | long term evolution of UTRAN (E-UTRAN) |
| Node B | base station |
| PDCCH | physical downlink control channel |
| PRB | physical resource block |
| RB | resource block |
| RBG | resource block group |
| UE | user equipment, such as a mobile station or mobile terminal |
| UL | uplink (UE to Node B) |
| UTRAN | universal terrestrial radio access network |

In LTE (E-UTRAN), DL resource allocation is signaled on the PDCCH. The resource allocation signaling bits indicate which physical resources (e.g., PRBs) are allocated for a given user (e.g., UE). One of the issues with the resource allocation signaling is that full resolution (e.g., 50 bits to indicate which of the 50 PRBs are allocated for the 10 MHz system bandwidth case) is needed for full flexibility, which in turn may require a lot of signaling bits. Thus, there have been discussions in 3GPP on how to reduce this amount of signaling without losing too much scheduling flexibility.

SUMMARY

The below summary section is intended to be merely exemplary and non-limiting.

In one exemplary embodiment of the invention, a method comprising: receiving a message comprising a resource allocation map comprising a first portion and a second portion; utilizing the first portion to determine a specific mapping scheme of a plurality of mapping schemes, wherein the determined specific mapping scheme is used for the second portion; and obtaining, based on the determined specific mapping scheme, resource allocation information based on the second portion.

In another exemplary embodiment of the invention, a program storage device readable by a machine, tangibly embodying a program of instructions executable by the machine for performing operations, said operations comprising: receiving a message comprising a resource allocation map comprising a first portion and a second portion; utilizing the first portion to determine a specific mapping scheme of a plurality of mapping schemes, wherein the determined specific mapping scheme is used for the second portion; and obtaining, based on the determined specific mapping scheme, resource allocation information based on the second portion.

In another exemplary embodiment of the invention, an apparatus comprising: a receiver configured to receive a message comprising a resource allocation map comprising a first portion and a second portion; and a processor configured to utilize the first portion of the received message to determine a specific mapping scheme of a plurality of mapping schemes, wherein the determined specific mapping scheme is used for the second portion of the received message, wherein the processor is further configured to obtain, based on the determined specific mapping scheme, resource allocation information based on the second portion of the received message.

In another exemplary embodiment of the invention, an apparatus comprising: means for receiving a message comprising a resource allocation map comprising a first portion and a second portion; means for utilizing the first portion to determine a specific mapping scheme of a plurality of mapping schemes, wherein the determined specific mapping scheme is used for the second portion; and means for obtaining, based on the determined specific mapping scheme, resource allocation information based on the second portion.

In another exemplary embodiment of the invention, a method comprising: generating a message comprising a resource allocation map comprising a first portion and a second portion, wherein the first portion is indicative of a specific mapping scheme of a plurality of mapping schemes that are applicable to the second portion; and transmitting the generated message.

In another exemplary embodiment of the invention, a program storage device readable by a machine, tangibly embodying a program of instructions executable by the machine for performing operations, said operations comprising: generating a message comprising a resource allocation map comprising a first portion and a second portion, wherein the first portion is indicative of a specific mapping scheme of a plurality of mapping schemes that are applicable to the second portion; and transmitting the generated message.

In another exemplary embodiment of the invention, an apparatus comprising: a processor configured to generate a message comprising a resource allocation map comprising a first portion and a second portion, wherein the first portion is indicative of a specific mapping scheme of a plurality of mapping schemes that are applicable to the second portion; and a transmitter configured to transmit the generated message.

In another exemplary embodiment of the invention, an apparatus comprising: means for generating a message comprising a resource allocation map comprising a first portion and a second portion, wherein the first portion is indicative of a specific mapping scheme of a plurality of mapping schemes that are applicable to the second portion; and means for transmitting the generated message.

In another exemplary embodiment of the invention, a computer-readable medium storing a data structure, said data structure comprising: a first portion of a resource allocation map; and a second portion of the resource allocation map, wherein the first portion is indicative of a specific mapping scheme of a plurality of mapping schemes that are applicable to the second portion, wherein the data structure is configured to enable a user equipment to utilize the first portion to determine the specific mapping scheme for the second portion and to obtain, based on the determined specific mapping scheme, resource allocation information based on the second portion.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 1A depicts a full bandwidth signaling option having a coarse resolution;

FIG. 1B shows a reduced bandwidth signaling option that uses a sub-sampling approach with a fine resolution;

FIG. 1C illustrates a reduced bandwidth signaling option that uses an island approach with a fine resolution;

FIG. 2A shows a full resolution PRB map;

FIG. 2B shows a full bandwidth (i.e., PRB map) at coarse resolution;

FIG. 3 shows a non-limiting, exemplary resource allocation map having a header structure in accordance with the exemplary embodiments of the invention;

DETAILED DESCRIPTION

Figure 4:
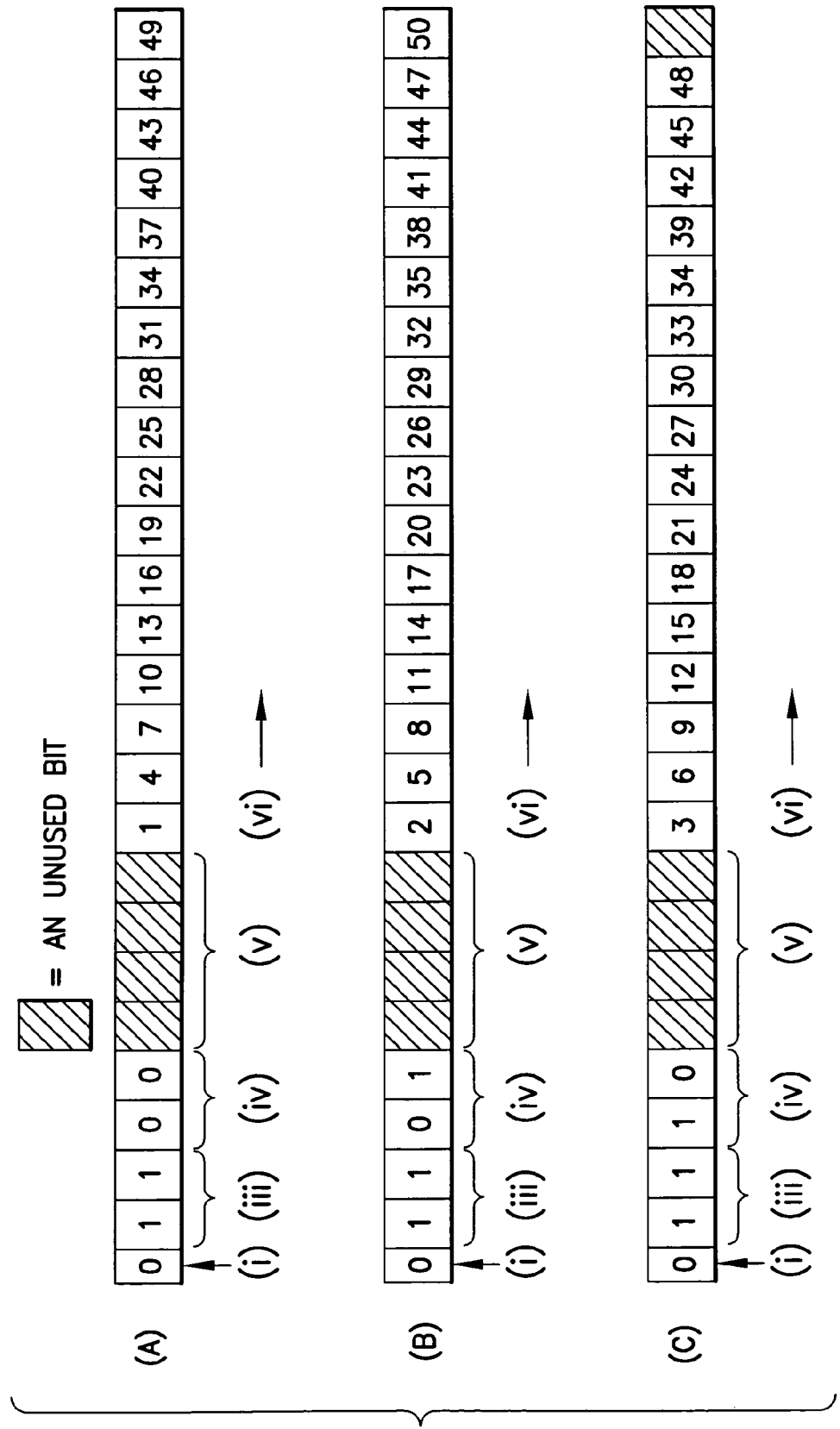
FIG. 4 illustrates one non-limiting example of resource allocation headers for a sub-sampling option with fine resolution for the 10 MHz system bandwidth case.

Reference is made to contribution R1-073835, "Outcome from offline discussion on downlink control signaling," Ericsson et al., 3GPP TSG RAN WG1 #50, Athens, Greece, Aug. 20-24, 2007.

As noted above, it may be desirable to reduce the amount of signaling without losing too much scheduling flexibility. The outcome from one 3GPP meeting (R1-073835) provided two approaches: approach 1 and approach 2.

Approach 1 groups RBs in the frequency domain. The group size may depend on the system BW. A bitmap indicates the RB groups to use, with at most 32 bits for 110 RB system BW and at most 14 bits for 25 RB system BW. Approach 1 sets the limit on control signaling overhead.

In contrast, approach 2 provides as much flexibility as possible within the limits described by approach 1. Approach 2 divides the system BW into subsets of RBs. The subsets may overlap. Typically, multiple subsets are used in the system BW, though small system BWs may use only a single subset. The subset index is signaled as part of the PDCCH contents. For the island approach, this is the starting position of an island. For sub-sampling, it is the index of the sub-sampling set. The allocation information includes an indication of which subsets the information applies to and an indication of which RBs in the subset are used. The nature of the indication is for future study, such as whether it is a bitmap or other scheme.

The exemplary embodiments of the invention afford flexibility while still attempting to reduce the size of the header structure. The starting point for this invention is that there is a single header for different approaches (e.g., approach 1 and approach 2) which indicates how to interpret the bitmap for the resource allocation.

As utilized herein, bitmap refers to an arranged (e.g., spatially arranged) map of bits (e.g., Boolean values). The (spatial) arrangement may be based on relative positioning or absolute positions, as non-limiting examples. As utilized herein, the term "field" or "fields" refers to a portion or region of a message, for example, having the described header structure. The various possible combinations of values in a resource allocation message, header and/or bitmap may be described as individual "states" of the message, header and/or bitmap.

The term "coupled to" as used herein is not intended to be limited to a direct connection between recited components or elements, but also encompasses dispositions wherein there may be one or more intervening components or elements between the recited ones.

FIGS. 1A, 1B and 1C, collectively referred to herein as FIG. 1, illustrate the general principle by showing the three signaling options that are described in the way-forward document on control signaling. FIG. 1A depicts a full bandwidth signaling option having a coarse resolution. FIG. 1B shows a reduced bandwidth signaling option that uses a sub-sampling approach with a fine resolution. FIG. 1C illustrates a reduced bandwidth signaling option that uses an island approach with a fine resolution. For the purposes of the below discussion, and by way of a non-limiting example, assume that the PRB grouping is based on three adjacent PRBs and that the sub-sampling period is also three PRBs long.

One issue in this context is that the header size may become bigger than needed in the sense that one might need to indicate many different options (e.g., states), and thus need additional signaling bits for the header. In the example options shown in FIG. 1, one would need a header size of 3 bits, for example, to indicate the arrangements described in Table 1 below.

TABLE 1

| Header value | Bit map interpretation |
|---|---|
| 0 | Full bandwidth, Grouping of 3 adjacent PRBs for each bit in the bitmap |
| 1 | Reduced bandwidth, sub-sampling by a factor of 3. Offset = 0. |
| 2 | Reduced bandwidth, sub-sampling by a factor of 3. Offset = 1. |
| 3 | Reduced bandwidth, sub-sampling by a factor of 3. Offset = 2. |
| 4 | Reduced bandwidth by a factor of 3, island approach. Offset = 0. |
| 5 | Reduced bandwidth by a factor of 3, island approach. Offset = ⅓ of system BW. |
| 6 | Reduced bandwidth by a factor of 3, island approach. Offset = ⅔ of system BW. |
| 7 | Not used (but could be defined for another island). |

One issue with the above three-bit structure is that if one wants to provide extra flexibility in terms of additional offsets for the island approach, one will need a larger header (i.e., additional bits for signaling). The R1-073835 contribution does not contain additional information on the header structure and, thus, does not address this problem.

Exemplary embodiments of the invention introduce a dynamic header structure for PRB allocation signaling, such that the amount of bits allocated for the overall header structure is reduced. As a non-limiting example, a single bit can be used to indicate whether approach 1 or approach 2 is being used. Furthermore, and as another non-limiting example, if approach 2 is being used, the bits in the bitmap reserved for approach 1 may be interpreted in such a way that at least a portion of them contain a new header that indicates the configuration of the remaining bitmap.

While discussed in the below examples in relation to approach 1 and approach 2, it should be appreciated that the exemplary embodiments of the invention are not limited thereto, and may be utilized in conjunction with other approaches, designs or arrangements. For example, some exemplary embodiments may be utilized in conjunction with a plurality (e.g., at least two) of different approaches (e.g., schemes, types, arrangements, designs), for example, as relating to resource allocation signaling. As another example, some exemplary embodiments may be utilized with more than two different approaches (e.g., three or more). Furthermore, it should also be appreciated that the various names (e.g., the island approach) or descriptions provided for the different approaches are non-limiting examples.

Note that in conjunction with the use of exemplary embodiments of the invention, for some exemplary embodiments it may be desirable to have the PRB grouping factor be smaller than the bandwidth reduction factor used for approach 2.

For reference and comparison purposes, FIG. 2A shows a full resolution PRB map and FIG. 2B shows a full bandwidth (i.e., PRB map) at coarse resolution. These are non-limiting examples presented for comparison purposes with the various non-limiting exemplary embodiments, such as those described in reference to other figures, for example, such as FIGS. 3-5.

FIG. 3 shows a non-limiting, exemplary resource allocation map having a header structure in accordance with the exemplary embodiments of the invention. An approach header bit (i) indicates whether approach 1 or approach 2 is in use. For example, an approach header bit (i) value of "1" may indicate use of a first approach (e.g., approach 1) while a value of "0" may indicate use of a second, different approach (e.g., approach 2).

If approach 1 is being used, the other bits in the header (ii) function as a simple bitmap indicating allocation of adjacent resources.

If approach 2 is being used, some of the other bits in the header are utilized as a new (i.e., second or further) header to indicate the scheme for the remaining bitmap. As shown in the exemplary resource allocation map of FIG. 3, two bits (iii) are used to indicate the signaling option being used for the PRB allocation (see FIG. 1). For example, a value of "11" may indicate the sub-sampling option (see FIG. 4) while values of "00", "01" and "10" may indicate respective islands for the island option (see FIG. 5). The use of bits as in field (iii) may be considered as the beginning of a new, second header that is located within the first header.

If the sub-sampling option is being used (a value of "11" for bits (iii)), two additional bits (iv) are used to indicate which sub-sampling offset is being used. The use of bits as in field (iv) further may be considered as the beginning of a third header located within the second header.

The four bits of field (v) are bits (i.e., bit fields) that may be used if one applies a non-equidistant sampling of the PRB vector. The other bits in the header (vi) function as a bitmap indicating allocation of PRBs.

In other exemplary embodiments, a greater or fewer number of bits may be used for one or more of the respective fields identified above. Furthermore, in other exemplary embodiments, one or more of the above-identified fields may not be present. As a non-limiting example, the bits of fields (iv), (v) and (vi) may comprise part of the bitmap such as when the island option is used (see FIG. 5). In further exemplary embodiments, one particular state of the header may indicate a special multiple island configuration. As a non-limiting example, the particular state may comprise a value of "11" for field (iii) and a value of "11" for field (iv) (i.e., a resource allocation header of: "0 11 11 . . . "). In other exemplary embodiments, one or more of the described bit fields may be combined. For example, fields (i) and (iii) or fields (iii) and (iv) may be combined such that the combined bit field is indicative of the information previously indicated by the separate fields. In further exemplary embodiments, additional bit fields may be utilized to indicate additional information. The additional indicated information may comprise any suitable information relating to the purpose of the header, such as additional information relating to DL resource allocation, for example.

FIG. 4 illustrates one non-limiting example of resource allocation headers for a sub-sampling option with fine resolution for the 10 MHz system BW case. FIG. 4 shows three headers, FIGS. 4A, 4B and 4C, that include 50 bits providing resource allocation information for up to 50 PRBs. The bits in field (vi) are numbered to indicate the PRB index in the bitmap. As is apparent, the sub-sampling period for the example shown in FIG. 4 is 3 PRBs.

Figure 5:
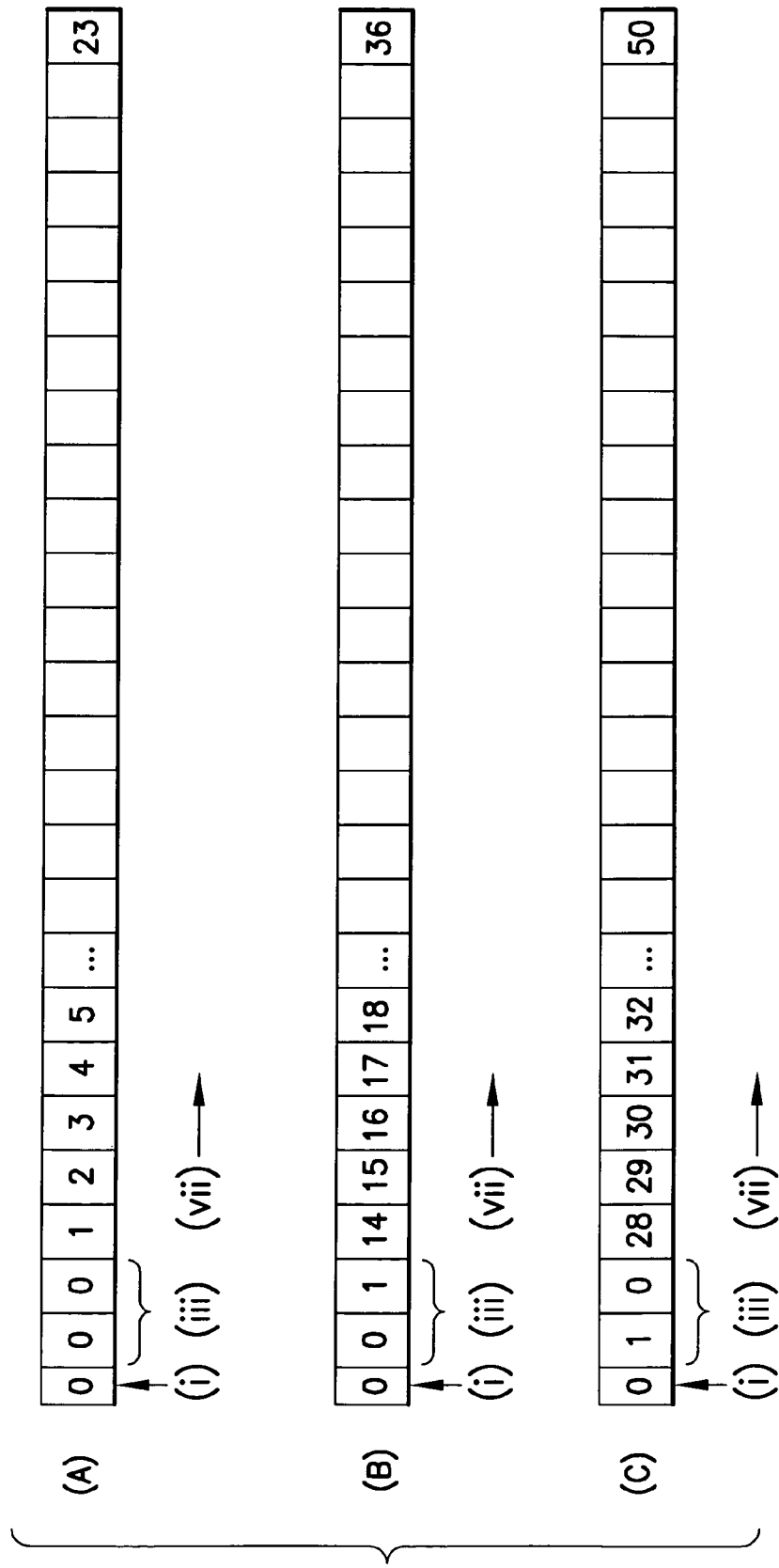
FIG. 5 illustrates one non-limiting example of resource allocation headers for an island option with fine resolution for the 10 MHz system bandwidth case.

FIG. 5 illustrates one non-limiting example of resource allocation headers for an island option with fine resolution for the 10 MHz system BW case. FIG. 5 shows three headers, FIGS. 5A, 5B and 5C, that include 50 bits providing resource allocation information for up to 50 PRBs. The bits in field (vii) are numbered to indicate the PRB index in the bitmap.

In other exemplary embodiments, different indexing of the bits may be utilized. In further exemplary embodiments, a different system BW and/or a different number of system resources (e.g., RBs, PRBs) may be utilized. In other exemplary embodiments, a different type of system resource or system resources may be allocated. In further exemplary embodiments, the resource allocation may be for a different channel or channels (e.g., UL resource allocation). In other exemplary embodiments, the resource allocation may be for communication between different types of devices (i.e., other than UE and Node B).

Figure 6:
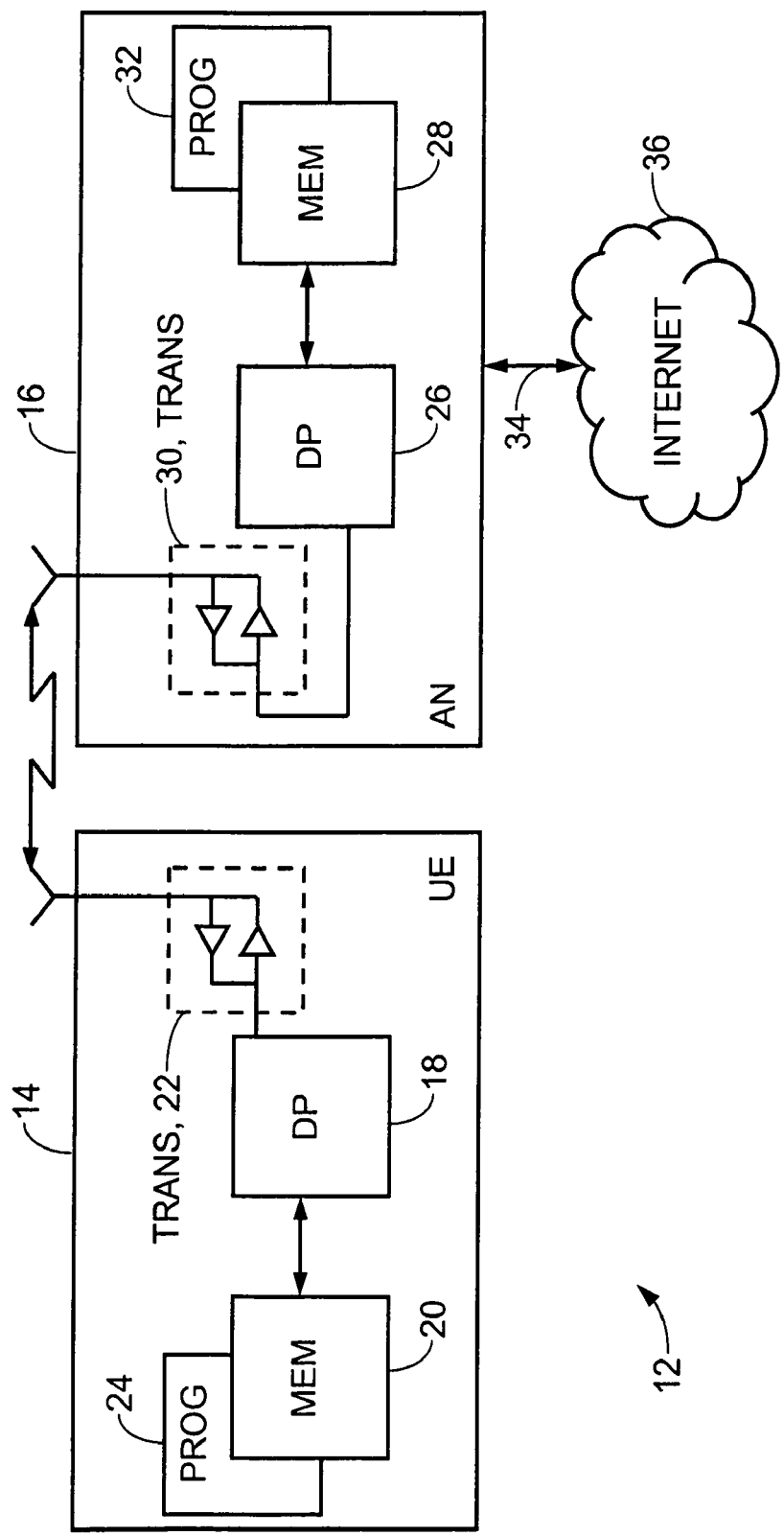
FIG. 6 shows a simplified block diagram of various exemplary electronic devices that are suitable for use in practicing the exemplary embodiments of this invention.

Reference is made to FIG. 6 for illustrating a simplified block diagram of various exemplary electronic devices that are suitable for use in practicing the exemplary embodiments of this invention. In FIG. 6, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example. At least one of the PROGs 24, 32 is assumed to include program instructions that, when executed by the associated DP, enable the electronic device to operate in accordance with the exemplary embodiments of this invention, as discussed herein.

In general, the various exemplary embodiments of the UE 14 can include, but are not limited to, mobile stations, mobile nodes, mobile phones, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

While described above in reference to memories (MEMS 20, 28), these components may generally be seen to correspond to storage devices, storage components and/or storage blocks. In some exemplary embodiments, these components may comprise one or more computer-readable mediums and/or one or more program storage devices.

While described above in reference to data processors (DPs 18, 26), these components may generally be seen to correspond to processors, processing devices, processing components, processing blocks, circuits, circuit devices, circuit components, circuit blocks, integrated circuits and/or chips (e.g., chips comprising one or more circuits).

While the maximum bitrate may be slightly reduced when using the sub-band and/or sub-sampling options, there a number of technical effects provided by any one or more of the exemplary embodiments of the invention. The needed header overhead is reduced to a minimum given the current decisions in 3GPP. Furthermore, one or more of the exemplary embodiments of the invention provide a dynamic way of defining headers that are indicative of which scheme to use for the resource allocation signaling. In addition, the exemplary embodiments of the invention generally will work with (e.g., any) clustering factor that is used for approach 1.

One consideration is that it may be desirable to have the sub-sampling (bandwidth reduction factor) for approach 2 be larger than the clustering factor for approach 1.

In accordance with exemplary embodiments of the invention, one can even have a clustering factor of "4" for 20 MHz BW and a bandwidth reduction factor of "5" for approach 2, and still only utilize 26 bits for signaling the DL resource allocation (i.e., 26 bits for signaling as considered for the 10 MHz system BW).

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in combination with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 7:
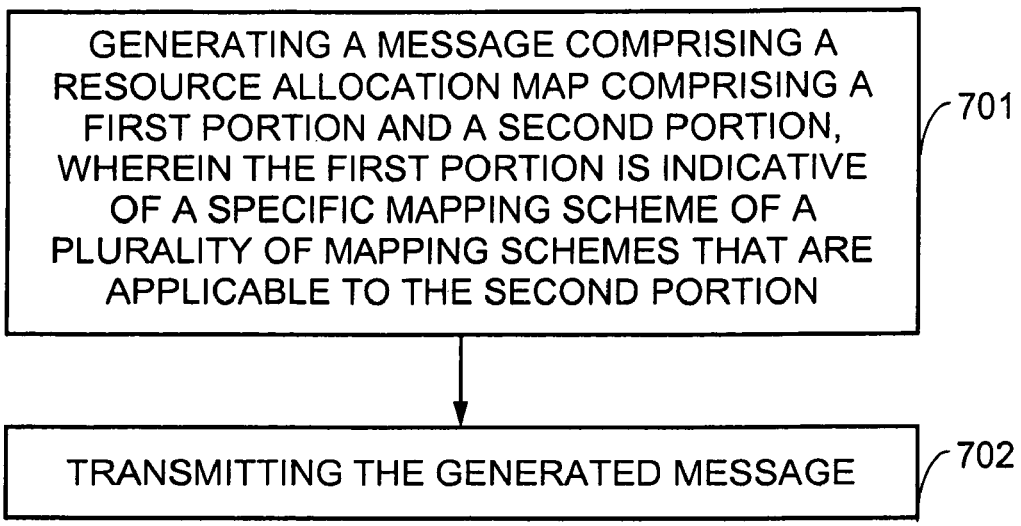
FIG. 7 depicts a flowchart illustrating one non-limiting example of a method for practicing the exemplary embodiments of this invention.

(1) In one non-limiting, exemplary embodiment, and as illustrated in FIG. 7, a method comprising: generating a message comprising a resource allocation map comprising a first portion and a second portion, wherein the first portion is indicative of a specific mapping scheme of a plurality of mapping schemes that are applicable to the second portion (701); and transmitting the generated message (702).

A method as in the above, wherein the first portion is indicative of whether the specific mapping scheme comprises a full BW scheme or a reduced BW scheme. A method as in any above, wherein the first portion is indicative of whether the specific mapping scheme utilizes a sub-sampling arrangement or an island arrangement. A method as in any above, wherein the second portion is indicative of whether the specific mapping scheme utilizes a sub-sampling arrangement or an island arrangement. A method as in any above, wherein the second portion comprises a bitmap for a DL resource allocation. A method as in any above, wherein the second portion comprises a bitmap for a DL resource allocation of RBs or PRBs. A method as in any above, wherein the second portion comprises a field for use when a non-equidistant sampling of a PRB vector is utilized.

A method as in any above, wherein the resource allocation map further comprises a third portion, wherein the second portion is indicative of a specific second mapping scheme of a plurality of second mapping schemes that are applicable to the third portion. A method as in any above, wherein the third portion comprises a bitmap for a DL resource allocation. A method as in any above, wherein the third portion comprises a bitmap for a DL resource allocation of RBs or PRBs. A method as in any above, wherein the third portion comprises a field for use when a non-equidistant sampling of a PRB vector is utilized.

A method as in any above, wherein the resource allocation map is for an E-UTRAN (LTE) system. A method as in any above, wherein the resource allocation map is for a 10 MHz system BW. A method as in any above, wherein the resource allocation map is for the allocation of fifty RBs or PRBs.

A method as in any above, wherein the method is implemented by and/or using a computer program. A method as in any above, wherein the method is implemented by a computer program tangibly embodied on a computer-readable medium, execution of the computer program resulting in operations comprising the steps (of performing) the method. A method as in any above, wherein the method is implemented by a program of instructions (e.g., a program, a computer program) stored on (tangibly embodied on/by) a program storage device (e.g., a computer-readable medium, a memory) readable by a machine (e.g., a computer, a mobile station, a mobile device, a mobile node), the program of instructions executable by the machine for performing operations, the operations comprise steps of utilizing the exemplary embodiments or steps of the method.

(2) In another non-limiting, exemplary embodiment, a program storage device readable by a machine, tangibly embodying a program of instructions executable by the machine for performing operations, said operations comprising: generating a message comprising a resource allocation map comprising a first portion and a second portion, wherein the first portion is indicative of a specific mapping scheme of a plurality of mapping schemes that are applicable to the second portion; and transmitting the generated message.

A program storage device as in the above, wherein the first portion is indicative of whether the specific mapping scheme comprises a full BW scheme or a reduced BW scheme. A program storage device as in any above, wherein the first portion is indicative of whether the specific mapping scheme utilizes a sub-sampling arrangement or an island arrangement. A program storage device as in any above, wherein the second portion is indicative of whether the specific mapping scheme utilizes a sub-sampling arrangement or an island arrangement. A program storage device as in any above, wherein the second portion comprises a bitmap for a DL resource allocation. A program storage device as in any above, wherein the second portion comprises a bitmap for a DL resource allocation of RBs or PRBs. A program storage device as in any above, wherein the second portion comprises a field for use when a non-equidistant sampling of a PRB vector is utilized.

A program storage device as in any above, wherein the resource allocation map further comprises a third portion, wherein the second portion is indicative of a specific second mapping scheme of a plurality of second mapping schemes that are applicable to the third portion. A program storage device as in any above, wherein the third portion comprises a bitmap for a DL resource allocation. A method as in any above, wherein the third portion comprises a bitmap for a DL resource allocation of RBs or PRBs. A program storage device as in any above, wherein the third portion comprises a field for use when a non-equidistant sampling of a PRB vector is utilized.

A program storage device as in any above, wherein the resource allocation map is for an E-UTRAN (LTE) system. A computer program product as in any above, wherein the resource allocation map is for a 10 MHz system BW. A program storage device as in any above, wherein the resource allocation map is for the allocation of fifty RBs or PRBs. A program storage device as in any above, the machine comprising a base station or a base station of a wireless communication network.

(3) In another non-limiting, exemplary embodiment, an apparatus comprising: a processor configured to generate a message comprising a resource allocation map comprising a first portion and a second portion, wherein the first portion is indicative of a specific mapping scheme of a plurality of mapping schemes that are applicable to the second portion; and a transmitter configured to transmit the generated message.

An apparatus as in the above, wherein the first portion is indicative of whether the specific mapping scheme comprises a full BW scheme or a reduced BW scheme. An apparatus as in any above, wherein the first portion is indicative of whether the specific mapping scheme utilizes a sub-sampling arrangement or an island arrangement. An apparatus as in any above, wherein the second portion is indicative of whether the specific mapping scheme utilizes a sub-sampling arrangement or an island arrangement. An apparatus as in any above, wherein the second portion comprises a bitmap for a DL resource allocation. An apparatus as in any above, wherein the second portion comprises a bitmap for a DL resource allocation of RBs or PRBs. An apparatus as in any above, wherein the second portion comprises a field for use when a non-equidistant sampling of a PRB vector is utilized.

An apparatus as in any above, wherein the resource allocation map further comprises a third portion, wherein the second portion is indicative of a specific second mapping scheme of a plurality of second mapping schemes that are applicable to the third portion. An apparatus as in any above, wherein the third portion comprises a bitmap for a DL resource allocation. A method as in any above, wherein the third portion comprises a bitmap for a DL resource allocation of RBs or PRBs. An apparatus as in any above, wherein the third portion comprises a field for use when a non-equidistant sampling of a PRB vector is utilized.

An apparatus as in any above, wherein the resource allocation map is for an E-UTRAN (LTE) system. An apparatus as in any above, wherein the resource allocation map is for a 10 MHz system BW. An apparatus as in any above, wherein the resource allocation map is for the allocation of fifty RBs or PRBs. An apparatus as in any above, wherein the apparatus comprises a base station.

(4) In another non-limiting, exemplary embodiment, an apparatus comprising: means for generating a message comprising a resource allocation map comprising a first portion and a second portion, wherein the first portion is indicative of a specific mapping scheme of a plurality of mapping schemes that are applicable to the second portion; and means for transmitting the generated message.

An apparatus as in the above, wherein the means for generating comprises a processor and the means for transmitting comprises a transmitter. An apparatus as in any above, wherein the apparatus comprises a base station. An apparatus as in any above, further comprising one or more aspects of the exemplary embodiments of the invention as described in further detail herein.

(5) In another non-limiting, exemplary embodiment, an apparatus comprising: generating circuitry configured to generate a message comprising a resource allocation map comprising a first portion and a second portion, wherein the first portion is indicative of a specific mapping scheme of a plurality of mapping schemes that are applicable to the second portion; and transmission circuitry configured to transmit the generated message.

An apparatus as in the above, wherein the apparatus comprises at least one circuit and/or at least one integrated circuit. An apparatus as in any above, wherein the apparatus comprises a base station. An apparatus as in any above, further comprising one or more aspects of the exemplary embodiments of the invention as described herein.

(6) In another non-limiting, exemplary embodiment, an apparatus comprising: at least one processor configured to generate a message comprising a resource allocation map comprising a first portion and a second portion, wherein the first portion is indicative of a specific mapping scheme of a plurality of mapping schemes that are applicable to the second portion; and to send (e.g., transmit) the generated message (e.g., to another apparatus, device, node and/or station).

An apparatus as in the above, wherein the apparatus comprises at least one circuit and/or at least one integrated circuit. An apparatus as in any above, wherein the apparatus comprises a base station. An apparatus as in any above, further comprising one or more aspects of the exemplary embodiments of the invention as described herein.

Figure 8:
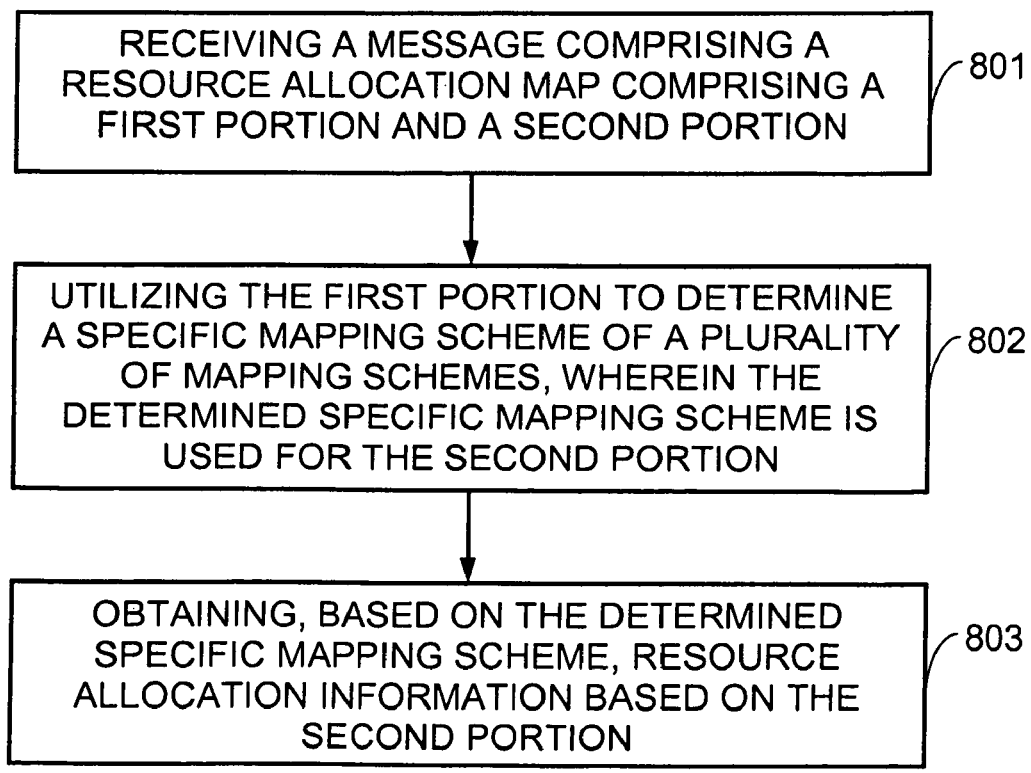
FIG. 8 depicts a flowchart illustrating another non-limiting example of a method for practicing the exemplary embodiments of this invention.

(7) In another non-limiting, exemplary embodiment, and as illustrated in FIG. 8, a method comprising: receiving a message comprising a resource allocation map comprising a first portion and a second portion (801); utilizing the first portion to determine a specific mapping scheme of a plurality of mapping schemes, wherein the determined specific mapping scheme is used for the second portion (802); and obtaining, based on the determined specific mapping scheme, resource allocation information based on the second portion (803).

A method as in the above, wherein the first portion is indicative of whether the specific mapping scheme comprises a full BW scheme or a reduced BW scheme. A method as in any above, wherein the first portion is indicative of whether the specific mapping scheme utilizes a sub-sampling arrangement or an island arrangement. A method as in any above, wherein the second portion is indicative of whether the specific mapping scheme utilizes a sub-sampling arrangement or an island arrangement. A method as in any above, wherein the second portion comprises a bitmap for a DL resource allocation. A method as in any above, wherein the second portion comprises a bitmap for a DL resource allocation of RBs or PRBs. A method as in any above, wherein the second portion comprises a field for use when a non-equidistant sampling of a PRB vector is utilized.

A method as in any above, wherein the resource allocation map further comprises a third portion, wherein the second portion is indicative of a specific second mapping scheme of a plurality of second mapping schemes that are applicable to the third portion. A method as in any above, wherein the third portion comprises a bitmap for a DL resource allocation. A method as in any above, wherein the third portion comprises a bitmap for a DL resource allocation of RBs or PRBs. A method as in any above, wherein the third portion comprises a field for use when a non-equidistant sampling of a PRB vector is utilized.

A method as in any above, wherein the resource allocation map is for an E-UTRAN (LTE) system. A method as in any above, wherein the resource allocation map is for a 10 MHz system BW. A method as in any above, wherein the resource allocation map is for the allocation of fifty RBs or PRBs.

A method as in any above, wherein the method is implemented by and/or using a computer program. A method as in any above, wherein the method is implemented by a computer program tangibly embodied on a computer-readable medium, execution of the computer program resulting in operations comprising the steps (of performing) the method. A method as in any above, wherein the method is implemented by a program of instructions (e.g., a program, a computer program) stored on (tangibly embodied on/by) a program storage device (e.g., a computer-readable medium, a memory) readable by a machine (e.g., a computer, a mobile station, a mobile device, a mobile node), the program of instructions executable by the machine for performing operations, the operations comprise steps of utilizing the exemplary embodiments or steps of the method.

(8) In another non-limiting, exemplary embodiment, a program storage device readable by a machine, tangibly embodying a program of instructions executable by the machine for performing operations, said operations comprising: receiving a message comprising a resource allocation map comprising a first portion and a second portion; utilizing the first portion to determine a specific mapping scheme of a plurality of mapping schemes, wherein the determined specific mapping scheme is used for the second portion; and obtaining, based on the determined specific mapping scheme, resource allocation information based on the second portion.

A program storage device as in the above, wherein the first portion is indicative of whether the specific mapping scheme comprises a full BW scheme or a reduced BW scheme. A program storage device as in any above, wherein the first portion is indicative of whether the specific mapping scheme utilizes a sub-sampling arrangement or an island arrangement. A program storage device as in any above, wherein the second portion is indicative of whether the specific mapping scheme utilizes a sub-sampling arrangement or an island arrangement. A program storage device as in any above, wherein the second portion comprises a bitmap for a DL resource allocation. A program storage device as in any above, wherein the second portion comprises a bitmap for a DL resource allocation of RBs or PRBs. A program storage device as in any above, wherein the second portion comprises a field for use when a non-equidistant sampling of a PRB vector is utilized.

A program storage device as in any above, wherein the resource allocation map further comprises a third portion, wherein the second portion is indicative of a specific second mapping scheme of a plurality of second mapping schemes that are applicable to the third portion. A program storage device as in any above, wherein the third portion comprises a bitmap for a DL resource allocation. A method as in any above, wherein the third portion comprises a bitmap for a DL resource allocation of RBs or PRBs. A program storage device as in any above, wherein the third portion comprises a field for use when a non-equidistant sampling of a PRB vector is utilized.

A program storage device as in any above, wherein the resource allocation map is for an E-UTRAN (LTE) system. A computer program product as in any above, wherein the resource allocation map is for a 10 MHz system BW. A program storage device as in any above, wherein the resource allocation map is for the allocation of fifty RBs or PRBs. A program storage device as in any above, implemented by a mobile device. A program storage device as in any above, implemented by a mobile node, a mobile station, a mobile device, a mobile apparatus or a mobile node/station/device/apparatus in a wireless communication network.

(9) In another non-limiting, exemplary embodiment, an apparatus comprising: a receiver configured to receive a message comprising a resource allocation map comprising a first portion and a second portion; and a processor configured to utilize the first portion of the received message to determine a specific mapping scheme of a plurality of mapping schemes, wherein the determined specific mapping scheme is used for the second portion of the received message, wherein the processor is further configured to obtain, based on the determined specific mapping scheme, resource allocation information based on the second portion of the received message.

An apparatus as in the above, wherein the first portion is indicative of whether the specific mapping scheme comprises a full BW scheme or a reduced BW scheme. An apparatus as in any above, wherein the first portion is indicative of whether the specific mapping scheme utilizes a sub-sampling arrangement or an island arrangement. An apparatus as in any above, wherein the second portion is indicative of whether the specific mapping scheme utilizes a sub-sampling arrangement or an island arrangement. An apparatus as in any above, wherein the second portion comprises a bitmap for a DL resource allocation. An apparatus as in any above, wherein the second portion comprises a bitmap for a DL resource allocation of RBs or PRBs. An apparatus as in any above, wherein the second portion comprises a field for use when a non-equidistant sampling of a PRB vector is utilized.

An apparatus as in any above, wherein the resource allocation map further comprises a third portion, wherein the second portion is indicative of a specific second mapping scheme of a plurality of second mapping schemes that are applicable to the third portion. An apparatus as in any above, wherein the third portion comprises a bitmap for a DL resource allocation. A method as in any above, wherein the third portion comprises a bitmap for a DL resource allocation of RBs or PRBs. An apparatus as in any above, wherein the third portion comprises a field for use when a non-equidistant sampling of a PRB vector is utilized.

An apparatus as in any above, wherein the resource allocation map is for an E-UTRAN (LTE) system. An apparatus as in any above, wherein the resource allocation map is for a 10 MHz system BW. An apparatus as in any above, wherein the resource allocation map is for the allocation of fifty RBs or PRBs. An apparatus as in any above, wherein the apparatus comprises a mobile device. An apparatus as in any above, wherein the apparatus comprises a mobile node in a wireless communication network. An apparatus as in any above, wherein the apparatus comprises a mobile phone. An apparatus as in any above, wherein the apparatus comprises a mobile station, mobile node, mobile phone, mobile apparatus or cellular phone.

(10) In another non-limiting, exemplary embodiment, an apparatus comprising: means for receiving a message comprising a resource allocation map comprising a first portion and a second portion; means for utilizing the first portion to determine a specific mapping scheme of a plurality of mapping schemes, wherein the determined specific mapping scheme is used for the second portion; and means for obtaining, based on the determined specific mapping scheme, resource allocation information based on the second portion.

An apparatus as in the above, wherein the means for receiving comprises a receiver and wherein the means for utilizing and the means for obtaining comprise a processor. An apparatus as in any of the above, wherein the apparatus comprises a mobile phone. An apparatus as in any above, further comprising one or more aspects of the exemplary embodiments of the invention as described in further detail herein.

(11) In another non-limiting, exemplary embodiment, an apparatus comprising: reception circuitry configured to receive a message comprising a resource allocation map comprising a first portion and a second portion; determination circuitry configured to utilize the first portion to determine a specific mapping scheme of a plurality of mapping schemes, wherein the determined specific mapping scheme is used for the second portion; and allocation circuitry configured to obtain, based on the determined specific mapping scheme, resource allocation information based on the second portion.

An apparatus as in the above, wherein the apparatus comprises at least one integrated circuit. An apparatus as in any above, wherein the apparatus comprises a mobile node, mobile station, mobile phone or mobile apparatus. An apparatus as in any of the above, further comprising one or more aspects of the exemplary embodiments of the invention as described herein.

(12) In another non-limiting, exemplary embodiment, an apparatus comprising: at least one processor configured to receive a message comprising a resource allocation map comprising a first portion and a second portion; to utilize the first portion to determine a specific mapping scheme of a plurality of mapping schemes, wherein the determined specific mapping scheme is used for the second portion; and to obtain, based on the determined specific mapping scheme, resource allocation information based on the second portion.

An apparatus as in the above, wherein the apparatus comprises at least one circuit and/or at least one integrated circuit. An apparatus as in any above, wherein the apparatus comprises a base station. An apparatus as in any above, further comprising one or more aspects of the exemplary embodiments of the invention as described herein.

(13) In another non-limiting, exemplary embodiment, a computer-readable medium tangibly embodying (e.g., storing) a data structure, the data structure comprising: a first portion of a resource allocation map; and a second portion of the resource allocation map, wherein the first portion is indicative of a specific mapping scheme of a plurality of mapping schemes that are applicable to the second portion.

A data structure as in the above, wherein the data structure is configured to enable a user equipment (e.g., a UE receiving the data structure) to utilize the first portion to determine the specific mapping scheme for the second portion and to obtain, based on the determined specific mapping scheme, resource allocation information based on the second portion.

A data structure as in any above, wherein the first portion is indicative of whether the specific mapping scheme comprises a full BW scheme or a reduced BW scheme. A data structure as in any above, wherein the first portion is indicative of whether the specific mapping scheme utilizes a sub-sampling arrangement or an island arrangement. A data structure as in any above, wherein the second portion is indicative of whether the specific mapping scheme utilizes a sub-sampling arrangement or an island arrangement. A data structure as in any above, wherein the second portion comprises a bitmap for a DL resource allocation. A data structure as in any above, wherein the second portion comprises a bitmap for a DL resource allocation of RBs or PRBs. A data structure as in any above, wherein the second portion comprises a field for use when a non-equidistant sampling of a PRB vector is utilized. A data structure as in any above, wherein the data structure comprises the entirety of the resource allocation map.

A data structure as in any above, further comprising: a third portion of the resource allocation map, wherein the second portion is indicative of a specific second mapping scheme of a plurality of second mapping schemes that are applicable to the third portion. A data structure as in any above, wherein the third portion comprises a bitmap for a DL resource allocation. A data structure as in any above, wherein the third portion comprises a bitmap for a DL resource allocation of RBs or PRBs. A data structure as in any above, wherein the third portion comprises a field for use when a non-equidistant sampling of a PRB vector is utilized.

A data structure as in any above, wherein the resource allocation map is for an E-UTRAN (LTE) system. A data structure as in any above, wherein the resource allocation map is for a 10 MHz system BW. A data structure as in any above, wherein the resource allocation map is for the allocation of fifty RBs or PRBs.

A data structure as in any above, wherein a base station comprises the computer-readable medium that tangibly embodies (e.g., stores) the data structure, wherein the data structure is transmitted (e.g., in a message) via a physical downlink control channel from the base station to a mobile station (e.g., a UE) within a wireless communication network (e.g., an E-UTRA network). A computer-readable medium tangibly embodying a data structure as in any above, wherein the computer-readable medium is embodied in a base station, wherein the data structure is transmitted via a physical downlink control channel from the base station to a mobile station within a wireless communication network. A computer-readable medium tangibly embodying a data structure as in any above, wherein the computer-readable medium is embodied in a base station, an access node or a mobile station.

(14) In another non-limiting, exemplary embodiment, a signal comprising: a first portion of a resource allocation map; and a second portion of the resource allocation map, wherein the first portion is indicative of a specific mapping scheme of a plurality of mapping schemes that are applicable to the second portion.

A signal as in the above, wherein the signal is configured to enable a user equipment (e.g., a UE receiving the data structure) to utilize the first portion to determine the specific mapping scheme for the second portion and to obtain, based on the determined specific mapping scheme, resource allocation information based on the second portion.

A signal as in any above, wherein the signal is configured to enable a user equipment, upon receiving the signal, to utilize the first portion to determine the specific mapping scheme for the second portion and to obtain, based on the determined specific mapping scheme, resource allocation information based on the second portion.

A signal as in any above, wherein the signal is stored on a storage medium (e.g., a computer-readable medium, a memory, a storage component, a storage device, an apparatus). A signal as in any above, wherein the signal comprises a data structure. A signal as in any above, wherein the signal comprises a data structure stored on a storage medium (e.g., a computer-readable medium, a memory, a storage component, a storage device, an apparatus). A signal as in any above, further comprising one or more aspects of the exemplary embodiments of the invention as described in further detail herein.

A storage medium (e.g., a computer-readable medium, a memory, a storage component, a storage device, an apparatus) tangibly embodying (e.g., storing) a signal (e.g., a data structure) as described in any of the above. A storage medium as in the above, further comprising one or more aspects of the exemplary embodiments of the invention as described in further detail herein.

(15) In another non-limiting, exemplary embodiment, a system comprising: a base station and a user equipment, wherein the base station comprises a first data processor and a transmitter, wherein the first data processor is configured to generate a message comprising a resource allocation map comprising a first portion and a second portion, wherein the first portion is indicative of a specific mapping scheme of a plurality of mapping schemes that are applicable to the second portion, wherein the transmitter is configured to transmit the generated message to the user equipment, wherein the user equipment comprises a receiver and a second data processor, wherein the receiver is configured to receive the transmitted message, wherein the second data processor is configured to utilize the first portion to determine the specific mapping scheme of the plurality of mapping schemes, wherein the data processor is further configured to obtain, based on the determined specific mapping scheme, resource allocation information based on the second portion.

An system as in the above, further comprising one or more aspects of the exemplary embodiments of the invention as described in further detail herein.

The exemplary embodiments of the invention, as discussed above and as particularly described with respect to exemplary methods, may be implemented as a computer program product comprising program instructions embodied on a tangible computer-readable medium: Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

The blocks depicted in FIGS. 7 and 8 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 7 and 8 should be considered merely exemplary and non-limiting. It should be appreciated that the blocks depicted in FIGS. 7 and 8 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 7 and 8 so as to implement one or more further exemplary embodiments of the invention, such as those described in further detail herein.

That is, the non-limiting, exemplary embodiments of the invention shown in FIGS. 7 and 8 may be implemented, practiced or utilized in conjunction with one or more further aspects in any combination (e.g., any combination that is suitable, practicable and/or feasible) and are not limited only to the blocks, steps, functions and/or operations illustrated in FIGS. 7 and 8.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

While the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems. It should further be noted that any and all references to a "base station" may, in further exemplary embodiments, be seen to correspond to an access node, a mobile station (e.g., a mobile node, mobile phone, mobile router) functioning as an access node or any other suitable apparatus or device, fixed or mobile, that is operable to function as an access node, base station or similar such component, as further configured to operate in accordance with and/or implement one or more exemplary embodiments of the invention.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. Below, various further non-limiting examples of such modifications and/or adaptations are described. However, all such and similar modifications of the teachings of this invention will still fall within the scope of this invention.

As a non-limiting example, exemplary embodiments of the invention may be utilized to signal the allocation of virtual resource blocks (VRBs) for one or more UEs. As another non-limiting example, the first and second portions may be received and/or transmitted via a physical downlink control channel (PDCCH). As a further non-limiting example, the mapping schemes may be referred to as downlink control information (DCI) formats. As another non-limiting example, the first portion may be referred to as a type field. As a further non-limiting example, the second portion may be referred to as a resource allocation (e.g., information comprising or consisting of the actual resource allocation). As another non-limiting example, a resource allocation field may comprise the first portion and the second portion. As a further non-limiting example, the first portion may comprise or consist of a one-bit field (e.g., that is indicative of the type/format of the second portion; that is indicative of the type/format of the second portion, where the second portion comprises or consists of a bitmap, such as a bitmap for a resource allocation, for example).

As another non-limiting example, the second portion (e.g., the resource allocation field) is interpreted (e.g., by the UE) depending on the first portion (e.g., the PDCCH DCI format detected). As a further non-limiting example, the first portion (e.g., the type field) may distinguish the different mapping schemes (e.g., the different types) by use of a number (e.g., types 0, 1 and/or 2). As another non-limiting example, the different mapping schemes (e.g., the DCI formats) may be referred to using a number (e.g., format 0, 1, 1A and/or 2). As a further non-limiting example, the second portion may comprise a bitmap that indicates the resource block groups (RBGs) that are allocated to the scheduled UE, where a RBG is a set of consecutive PRBs. As another non-limiting example, the second portion may comprise a bitmap that indicates to a scheduled UE the PRBs from a set of PRBs from one RBG subset of a plurality of RBG subsets.

It should be noted that the above-described further non-limiting, exemplary aspects may be utilized in any suitable and/or practicable combination in conjunction with one another and/or in conjunction with one or more other aspects of the exemplary embodiments of the invention as described herein. Furthermore, as non-limiting examples, the above-described further non-limiting, exemplary aspects may be utilized in conjunction with the exemplary embodiments of the invention as implemented by the described exemplary methods, exemplary program storage devices, exemplary computer-readable mediums, exemplary computer programs, exemplary computer program products, exemplary data structures, exemplary apparatus and/or exemplary systems.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
  receiving, by an apparatus, a message comprising a resource allocation map, wherein the resource allocation map comprises a first portion and a second portion, wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to the apparatus, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the apparatus;
  utilizing, by the apparatus, the first portion to determine the indicated mapping scheme to be used for the second portion; and
  obtaining, by the apparatus based on the determined mapping scheme, the resource allocation information from the second portion.

2. A method as in claim 1, wherein the first portion comprises a one-bit field.

3. A method as in claim 1, wherein the second portion comprises a bitmap for a downlink resource allocation.

4. A method as in claim 3, wherein the downlink resource allocation is for resource blocks or physical resource blocks.

5. A method as in claim 1, wherein the message is received via a physical downlink control channel.

6. A non-transitory program storage device readable by a machine, tangibly embodying a program of instructions executable by the machine for performing operations, said operations comprising:
  receiving a message comprising a resource allocation map, wherein the resource allocation map comprises a first portion and a second portion, wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to the apparatus, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the apparatus;

utilizing the first portion to determine the indicated mapping scheme to be used for the second portion; and obtaining, based on the determined mapping scheme, the resource allocation information from the second portion.

7. A program storage device as in claim 6, wherein the first portion comprises a one-bit field.

8. A program storage device as in claim 6, wherein the second portion comprises a bitmap for a downlink resource allocation.

9. A program storage device as in claim 8, wherein the downlink resource allocation is for resource blocks or physical resource blocks.

10. A program storage device as in claim 6, wherein the message is received via a physical downlink control channel.

11. An apparatus comprising:
at least one processor; and
at least one memory including computer program instructions, the at least one memory and the computer program instructions being configured to, with the at least one processor, cause the apparatus at least to perform:
receive a message comprising a resource allocation map, wherein the resource allocation map comprises a first portion and a second portion, wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to the apparatus, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the apparatus;
utilize the first portion of the received message to determine the indicated mapping scheme to be used for the second portion, and
obtain, based on the determined mapping scheme, the resource allocation information from the second portion.

12. An apparatus as in claim 11, wherein the first portion comprises a one-bit field.

13. An apparatus as in claim 11, wherein the second portion comprises a bitmap for a downlink resource allocation.

14. An apparatus as in claim 13, wherein the downlink resource allocation is for resource blocks or physical resource blocks.

15. An apparatus as in claim 11, wherein the message is received by the receiver via a physical downlink control channel.

16. An apparatus as in claim 11, wherein the apparatus comprises a mobile station.

17. An apparatus comprising:
means for receiving a message comprising a resource allocation map, wherein the resource allocation map comprises a first portion and a second portion, wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to the apparatus, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the apparatus;
means for utilizing the first portion to determine the indicated mapping scheme to be used for the second portion; and
means for obtaining, based on the determined mapping scheme, the resource allocation information from the second portion.

18. An apparatus as in claim 17, wherein the first portion comprises a one-bit field.

19. An apparatus as in claim 17, wherein the second portion comprises a bitmap for a downlink resource allocation.

20. An apparatus as in claim 19, wherein the downlink resource allocation is for resource blocks or physical resource blocks.

21. An apparatus as in claim 17, wherein the message is received by the means for receiving via a physical downlink control channel.

22. An apparatus as in claim 17, wherein the apparatus comprises a mobile station.

23. A method comprising:
generating, by a first apparatus, a message comprising a resource allocation map, wherein the resource allocation map comprises a first portion and a second portion, wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to a second apparatus, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the second apparatus; and
transmitting, the first apparatus, the generated message towards a second apparatus.

24. A method as in claim 23, wherein the first portion comprises a one-bit field.

25. A method as in claim 23, wherein the second portion comprises a bitmap for a downlink resource allocation.

26. A method as in claim 25, wherein the downlink resource allocation is for resource blocks or physical resource blocks.

27. A method as in claim 23, wherein the message is transmitted via a physical downlink control channel.

28. A non-transitory program storage device readable by a machine, tangibly embodying a program of instructions executable by the machine for performing operations, said operations comprising:
generating a message comprising a resource allocation map, wherein the resource allocation map comprises a first portion and a second portion, wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to an apparatus, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the apparatus; and transmitting the generated message towards the apparatus.

29. A program storage device as in claim 28, wherein the first portion comprises a one-bit field.

30. A program storage device as in claim 28, wherein the second portion comprises a bitmap for a downlink resource allocation.

31. A program storage device as in claim 30, wherein the downlink resource allocation is for resource blocks or physical resource blocks.

32. A program storage device as in claim 28, wherein the message is transmitted via a physical downlink control channel.

33. An apparatus comprising:
at least one processor; and
at least one memory including computer program instructions, the at least one memory and the computer program instructions being configured to, with the at least one processor, cause the apparatus at least to perform:
generate a message comprising a resource allocation map, wherein the resource allocation map comprises a first portion and a second portion, wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to another apparatus, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the other apparatus, and
transmit the generated message towards the other apparatus.

34. An apparatus as in claim 33, wherein the first portion comprises a one-bit field.

35. An apparatus as in claim 33, wherein the second portion comprises a bitmap for a downlink resource allocation.

36. An apparatus as in claim 35, wherein the downlink resource allocation is for resource blocks or physical resource blocks.

37. An apparatus as in claim 33, wherein the generated message is transmitted by the transmitter via a physical downlink control channel.

38. An apparatus as in claim 33, wherein the apparatus comprises a base station or an access node.

39. An apparatus comprising:
means for generating a message comprising a resource allocation map, wherein the resource allocation map comprises a first portion and a second portion, wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to another apparatus, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the other apparatus; and means for transmitting the generated message towards the other apparatus.

40. An apparatus as in claim 39, wherein the first portion comprises a one-bit field.

41. An apparatus as in claim 39, wherein the second portion comprises a bitmap for a downlink resource allocation.

42. An apparatus as in claim 41, wherein the downlink resource allocation is for resource blocks or physical resource blocks.

43. An apparatus as in claim 39, wherein the generated message is transmitted by the means for transmitting physical downlink control channel.

44. An apparatus as in claim 39, wherein the apparatus comprises a base station or an access node.

45. A non-transitory computer-readable medium storing a data structure, said data structure comprising:
a first portion of a resource allocation map; and
a second portion of the resource allocation map,
wherein the first portion is indicative of a first mapping scheme or a second mapping scheme, wherein the indicated first mapping scheme or second mapping scheme is applicable to the second portion, wherein under the first mapping scheme the second portion consists of resource allocation information that indicates at least one group of physical resource blocks that is allocated to a user equipment, wherein under the second mapping scheme the second portion comprises a third portion and a fourth portion, wherein the third portion is indicative of at least one aspect relating to the fourth portion, wherein the fourth portion comprises resource allocation information for resource blocks that are allocated to the user equipment, wherein the data structure is configured to enable the user equipment to utilize the first portion to determine the indicated mapping scheme for the second portion and to obtain, based on the determined mapping scheme, the resource allocation information from the second portion.

46. A computer-readable medium as in claim 45, wherein the first portion comprises a one-bit field.

47. A computer-readable medium as in claim 45, wherein the second portion comprises a bitmap for a downlink resource allocation.

48. A computer-readable medium as in claim 47, wherein the downlink resource allocation is for resource blocks or physical resource blocks.

49. A computer-readable medium as in claim 45, wherein the computer-readable medium is embodied in a base station, wherein the data structure is transmitted via a physical downlink control channel from the base station to a mobile station within a wireless communication network.

50. A computer-readable medium as in claim 45, wherein the computer-readable medium is embodied in a base station, an access node or a mobile station.

51. A method as in claim 1, wherein the third portion comprises a field for use when a non-equidistant sampling of a physical resource block vector is utilized.

52. An apparatus as in claim 11, wherein the third portion comprises a field for use when a non-equidistant sampling of a physical resource block vector is utilized.

53. A method as in claim 23, wherein the third portion comprises a field for use when a non-equidistant sampling of a physical resource block vector is utilized.

54. An apparatus as in claim 33, wherein the third portion comprises a field for use when a non-equidistant sampling of a physical resource block vector is utilized.

* * * * *

UNITED STATES PATENT AND TRADEMARK OFFICE
CERTIFICATE OF CORRECTION

PATENT NO. : 8,274,960 B2  Page 1 of 1
APPLICATION NO. : 12/284958
DATED : September 25, 2012
INVENTOR(S) : Frederiksen et al.

It is certified that error appears in the above-identified patent and that said Letters Patent is hereby corrected as shown below:

Claim 23, col. 20, line 47 delete "transmitting, the" and insert --transmitting, by the--.

Signed and Sealed this
Twentieth Day of November, 2012

David J. Kappos
*Director of the United States Patent and Trademark Office*